United States Patent
Kuwabara et al.

(10) Patent No.: US 9,122,364 B2
(45) Date of Patent: Sep. 1, 2015

(54) INPUT DEVICE

(75) Inventors: Megumi Kuwabara, Yokohama (JP); Junichi Ujii, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 739 days.

(21) Appl. No.: 13/147,762

(22) PCT Filed: Feb. 3, 2010

(86) PCT No.: PCT/JP2010/000647
§ 371 (c)(1),
(2), (4) Date: Aug. 3, 2011

(87) PCT Pub. No.: WO2010/090010
PCT Pub. Date: Aug. 12, 2010

(65) Prior Publication Data
US 2011/0285659 A1  Nov. 24, 2011

(30) Foreign Application Priority Data
Feb. 3, 2009 (JP) .................. 2009-022445

(51) Int. Cl.
G06F 3/041 (2006.01)
G06F 3/0481 (2013.01)
G06F 3/0482 (2013.01)
G06F 3/0488 (2013.01)

(52) U.S. Cl.
CPC .............. *G06F 3/0481* (2013.01); *G06F 3/041* (2013.01); *G06F 3/0414* (2013.01); *G06F 3/0482* (2013.01); *G06F 3/04883* (2013.01)

(58) Field of Classification Search
CPC ... G06F 3/0488; G06F 3/04883; G06F 3/044; G06F 3/04886; G06F 3/045; G06F 3/016; G06F 3/011; A63F 2300/1037
USPC .................................. 715/701, 702
See application file for complete search history.

(56) References Cited

U.S. PATENT DOCUMENTS

| 5,065,347 | A  | * | 11/1991 | Pajak et al. ............... 715/835 |
| 5,680,562 | A  | * | 10/1997 | Conrad et al. ............ 715/797 |
| 5,793,360 | A  |   | 8/1998  | Fleck et al. |
| 5,917,492 | A  | * | 6/1999  | Bereiter et al. ........... 715/854 |
| 6,307,545 | B1 | * | 10/2001 | Conrad et al. ............ 715/781 |

(Continued)

FOREIGN PATENT DOCUMENTS

| JP | 8511637  | 12/1996 |
| JP | 09-6519  | 1/1997  |

(Continued)

OTHER PUBLICATIONS

Microsoft Corp., "How to Close a Folder and All Its Parent Folders". Microsoft Support, Jan. 19, 2007, United States URL: http://support.microsoft.com/kb/141210/EN-US.

(Continued)

*Primary Examiner* — Andrew Sasinowski
*Assistant Examiner* — Mihir Rayan

(57) ABSTRACT

An input device is disclosed. An input device comprises a display unit, an input unit, a load detection unit and a control unit. The display unit displays an object of a folder with a hierarchical structure. The input unit receives pressing inputs with respect to the display unit. The load detection unit detects a pressing load with respect to the input unit. The control unit opens and closes folders based on a change in the pressing load.

10 Claims, 12 Drawing Sheets

(56) References Cited

U.S. PATENT DOCUMENTS

| | | | |
|---|---|---|---|
| 6,567,102 B2 * | 5/2003 | Kung | 345/660 |
| 6,940,494 B2 * | 9/2005 | Hoshino et al. | 345/173 |
| 7,610,564 B1 * | 10/2009 | Pfohe et al. | 715/854 |
| 2002/0196238 A1 | 12/2002 | Tsukada et al. | |
| 2004/0021643 A1 | 2/2004 | Hoshino et al. | |
| 2004/0150631 A1 | 8/2004 | Fleck et al. | |
| 2006/0066590 A1 | 3/2006 | Ozawa et al. | |
| 2006/0132455 A1 | 6/2006 | Rimas-Ribikauskas et al. | |
| 2006/0132457 A1 * | 6/2006 | Rimas-Ribikauskas et al. | 345/173 |
| 2007/0222768 A1 * | 9/2007 | Geurts et al. | 345/173 |
| 2008/0024454 A1 | 1/2008 | Everest | |
| 2008/0094367 A1 * | 4/2008 | Van De Ven et al. | 345/173 |
| 2009/0160793 A1 * | 6/2009 | Rekimoto | 345/173 |
| 2009/0237374 A1 * | 9/2009 | Li et al. | 345/174 |
| 2010/0060605 A1 * | 3/2010 | Rimas-Ribikauskas et al. | 345/173 |
| 2010/0149124 A1 * | 6/2010 | Kim et al. | 345/173 |
| 2011/0279395 A1 | 11/2011 | Kuwabara et al. | |
| 2012/0038580 A1 * | 2/2012 | Sasaki | 345/173 |
| 2012/0126962 A1 * | 5/2012 | Ujii et al. | 340/407.2 |

FOREIGN PATENT DOCUMENTS

| | | |
|---|---|---|
| JP | 10-500516 | 1/1998 |
| JP | 2000-207079 | 7/2000 |
| JP | 2001-202192 | 7/2001 |
| JP | 2004-070492 | 3/2004 |
| JP | 2004-234662 | 8/2004 |
| JP | 2006-311224 | 11/2006 |
| JP | 2008-508628 | 3/2008 |
| JP | 2008-250924 | 10/2008 |
| WO | WO96/28777 | 9/1996 |
| WO | WO2009008568 * | 1/2009 ............. G06F 3/033 |

OTHER PUBLICATIONS

Office Action dated Aug. 20, 2013 issued by Japanese Patent Office for Japanese Patent Application No. 2012-286250.

Office Action dated Mar. 25, 2014 issued by Japanese Patent Office for Japanese Patent Application No. 2012-286250.

* cited by examiner (A)

(B)

(C)

(A)

(B)

INPUT DEVICE

The present application claims the priority rights of Japanese Patent Application No. 2009-022445 filed on Feb. 3, 2009, and incorporates herein the entire disclosure of the application for reference.

TECHNICAL FIELD

The present invention relates to input devices and particularly relates to an input device comprising a touch panel.

BACKGROUND ART

For mobile terminals such as mobile phones, for example, various input devices that a user uses to operate a terminal have been developed according to the function or usage of each terminal. In many cases, a user conducts by directly pressing mechanical keys, buttons, or the like, which are disposed on the surface of the body of a mobile terminal, with a finger and the like.

Normally, mechanical keys (e.g. numerical keys and the like) of an input device in such a terminal are preliminarily arranged in accordance with the primary usage of the terminal. Therefore, in general, the physical key arrangement provided initially cannot be changed afterwards.

Incidentally, nowadays, as there are mobile phones installed with digital cameras or music playing functions, various kinds of functions are incorporated in small mobile terminals. There are those, such as mobile phones, installed with many auxiliary functions besides their primary terminal usage or those equipped with a plurality of primary usages in one terminal, such as schedule management or address books as in PDA (personal digital assistant) and the like. In such a terminal, if the key arrangement is fixed, sometimes a user is significantly inconvenienced during operation input depending on the function being used.

In order to eliminate such inconveniences in operation inputs, input devices have been disclosed comprising a touch panel which is configured by arranging a clear input unit on the front surface of a liquid crystal display screen consisting of a display unit (e.g. refer to Patent Document 1). Generally, an input device having such a touch panel displays an image of operation keys, buttons and the like, and characters and a string of characters prompting an input (from hereon referred as "object") on the display screen of the touch panel. If a user presses an object displayed on the display screen, an input unit corresponding to the location in the touch panel receives the input.

A folding type mobile phone described in Patent Document 1 displays objects in an arbitrary arrangement on the display screen, is capable of receiving operation inputs from a user, and is capable of configuring a free arrangement of keys and the like. As a result, the mobile phone is capable of providing very favorable operability by arbitrarily changing the arrangement of objects according to the function, every time when each function of the terminal is switched. When the user uses a digital camera function equipped in the mobile phone, for example, the mobile phone is capable of displaying on the touch panel an object that constitutes an operation part for a digital camera, and receiving operation inputs. In contrast, when a user inputs characters for e-mails and the like using the mobile phone, the mobile phone is capable of receiving inputs by displaying an object that constitutes a keyboard such as one used in a personal computer on a touch panel. In this manner, this mobile phone is capable of receiving operation inputs by respectively optimizing one input device for a plurality of functions as a result of comprising a touch panel.

Furthermore, since an input device having a touch panel receives inputs according to an input method in which a user directly contacts (touches) objects that are displayed on a display unit with a fingertip or the like, the user can conduct very intuitive operations. That is, the user conducts operations by directly touching the objects that are being displayed on a screen with a fingertip or the like, following guidance that is displayed on the screen of a touch panel. Therefore, the user can operate a terminal very easily by intuitive operations in accordance with the guidance displayed on the screen, resulting in an expected reduction in error operations.

In this manner, because of the advantages of a touch panel that can enhance the degree of freedom in configuring an input unit and that allows a user to conduct operation inputs very intuitively, there is an increasing tendency towards terminal devices with an input device comprising a touch panel.

Besides mobile terminals, such an input device having a touch panel like the one described above is provided for an ATM (Automated Teller Machine) at a bank and the like, and a ticketing machine at a station and the like, and is commonly used nowadays. Furthermore, when an employee processes an order from a customer in shops such as fast food restaurants and the like, the work is conducted using a terminal device comprising an input device with a touch panel such as one described above. By using a touch panel for an input device, mechanical operation buttons, keys or the like, such as a keyboard, besides a touch panel becomes inessential. Therefore, less space is required for arranging mechanical operation buttons or the like on the main body of a terminal device, and thus, overall down-sizing of the terminal device itself can be achieved. This, in turn, makes it possible to enhance the degree of freedom for the mounting location of a terminal device in various shops, inside train stations, and the like.

Furthermore, the operation inputs of a personal computer (PC) may also be conducted from a display that comprises a touch panel. In general, operation inputs with respect to a PC vary depending on the application program to be used (from hereon, simply referred as "application"). However, as a result of development of a GUI (Graphical User Interface), many applications have been designed to conduct intuitive operations. Moreover, even if applications to be used are different, many operations of files or folders conducted on a desktop that is displayed on a display are common due to requirements with respect to the intuitive operability. Therefore, many known operation inputs of a PC were conducted mainly by using input devices such as a keyboard or a mouse, but a user may now conduct such operation inputs very intuitively using a display comprising a touch panel (for example, see Patent Document 2).

FIG. 11 is an illustration schematically illustrating a configuration of a data transfer system that includes an information processor described in the Patent Document 2. In FIG. 11, a data transfer system 100 comprises a data storage playback device 110 and a mobile type data storage playback device (mobile type storage playback device) 120. The data storage playback device 110 has storage and playback functions of data (for example, music data), and the mobile type storage playback device 120 also has storage and playback functions of music data. The data storage playback device 110 and the mobile type storage playback device 120 are communicably connected to each other via a communication cable 130.

The data storage playback device 110 is capable of storing music data ripped from a CD or music data downloaded from a music distribution server (not shown in Figures) via a network NT. A user can transfer the music data stored in the data storage playback device 110 to the mobile type storage playback device 120 by conducting operations on a display unit with a touch panel 140. As a result, the data storage playback device 120 is capable of reproducing music data by storing the transferred music data even after the connection to the communication cable 130 is cut off.

FIG. 12 is an illustration schematically illustrating a user conducting operations of a folder on the display unit with a touch panel 140 in the data storage playback device 110. As shown in FIG. 12(A), an icon A 100 and an icon A 200 for starting up an application are displayed on the display unit with a touch panel 140. When the user directly contacts (touches) these icons with a fingertip or the like, the corresponding application starts. It is presumed to be set in such a way that the start up operation may be conducted by an operation of quickly touching twice (double touching) an icon on the display unit with a touch panel 140, which is equivalent to a double-click conducted by an input device such as a mouse. Otherwise, it is also possible to presume to be set in such a way that the operation may be conducted by touching once (single touch) an icon on the display unit with a touch panel 140, which is equivalent to a single-click conducted by an input device such as a mouse.

Furthermore, an icon F100 representing a folder A and an icon F200 representing a folder B are displayed on a display unit with a touch panel unit 140. Each of these folders A and B may include a plurality of files and/or more folders according to the hierarchical structure of a conventional directory. Furthermore, in the event of conducting an operation regarding these folders A and B, the user can conduct an operation corresponding to a conventional operation method of folders that has been carried out with PCs.

Therefore, for example, when a user double touches (or single-touches) the icon F100 of the folder A as shown in FIG. 12(A), the data storage playback device 110 can display files that are included in the folder A as shown in FIG. 12(B). If another folder is further included in the folder A, by the user's double-touch (or single-touch), the data storage playback device 110 can display files and/or more folders that are included in the folder. In FIG. 12(B), a folder window is displayed, and files in the folder A are displayed.

In general, in an input device such as the display unit with a touch panel 140 of the data storage playback device 110, when an operation of closing a folder window that is displaying files and the like included in a folder takes place, the user has to touch an icon as a closing operation. In FIG. 16 (B), for example, the user can close a folder window (from hereon referred as "closing" a folder) by touching an x-mark that is displayed in the upper right of the folder window. Moreover, when a file and the like included in a folder is displayed, in case of moving to the hierarchy that is immediately above in the hierarchical structure of the directory (from hereon, this operation is also referred as "closing" a folder), the user has to touch an icon such as "return" or the like.

RELATED ART

Patent Documents

Patent Document 1: Japanese Unexamined Patent Application Publication No. 2006-311224
Patent Document 2: Japanese Unexamined Patent Application Publication No. 2008-250924

SUMMARY OF THE INVENTION

Problems to be Solved by the Invention

Recent years, along with the reduction in cost of storage devices such as flash memory and the like, the storage capacity of all kinds of terminals has significantly increased. For example, even small size terminals such as mobile terminals are now capable of storing an extremely large number of folders or files. As the number of files, folders or the like stored in terminals increases, the hierarchical structure of the directory becomes complicated and the number of hierarchies also increases. In order to reach a file or a folder for a specific purpose among a large number of files or folders included in the increased number of complicated hierarchies, a user is required to repeat an operation just like the one described above to open/close folders a multiple number of times.

For example, if the hierarchy where the folder for the purpose exists is located at a level that is lower than the hierarchy of the current folder (current directory) by a plurality of hierarchies, the user is required to conduct an operation input with respect to the object of the folder for each hierarchy to open the folder. Specifically, for example, in the case of the aforementioned display unit with a touch panel 140, the user has to repeatedly touch folder icons a multiple number of times. Likewise, also in cases in which the folder for a purpose is located at a level that is higher than the hierarchy of the current folder by a plurality of hierarchies, the user has to conduct an operation input with respect to an object (icon) such as "return" and the like for every hierarchy.

In this manner, even in the event of moving to a higher hierarchical level or moving to a lower hierarchical level, an operation input with respect to an object for each hierarchy is required in known input devices, making it time and effort consuming in the event of moving across the hierarchies of a folder with a plurality of hierarchical structures.

Therefore, an objective of the present invention designed in view of such a situation is to provide an input device capable of simply and promptly conducting folder operations using a touch panel.

Means for Solving the Problems

According to a first aspect of the invention to achieve the above objective, an input device comprises: a display unit displaying an object of a folder with a hierarchical structure; an input unit receiving pressing inputs with respect to the display unit; a load detection unit detecting a pressing load with respect to the input unit; and a control unit controlling that a first folder is opened if the load detection unit detects a pressing load, which changes from a state of not satisfying a first load standard to a state of satisfying the first load standard, with respect to the input unit corresponding to a location of the object of the first folder, and after the first folder is opened, a second folder included in a hierarchy that is immediately below the first folder is opened if the load detection unit detects a pressing load, which changes from a state of not satisfying a second load standard higher than the first load standard to a state of satisfying the second load standard, with respect to the input unit.

According to a second aspect of the invention, in the input device the first aspect of the invention, the control unit further controls that the second folder is closed if the load detection unit detects a pressing load, which changes from a state of satisfying the second load standard to a state of not satisfying the second load standard, with respect to the input unit, and the first folder is closed if the load detection unit detects a pressing load, which changes from a state of satisfying the first load standard to a state of not satisfying the first load standard, with respect to the input unit.

According to a third aspect of the invention, an input device comprises: a display unit displaying an object of a folder with a hierarchical structure; an input unit receiving pressing inputs with respect to the display unit; a load detection unit detecting a pressing load with respect to the input unit; and a control unit controlling that, when a first folder displayed on the display unit and a second folder included in a hierarchy that is immediately below the first folder are open, the second folder is closed if the load detection unit detects a pressing load, which changes from a state of not satisfying a first load standard to a state of satisfying the first load standard, with respect to the input unit; and the first folder is closed if the load detection unit detects a pressing load, which changes from a state of not satisfying a second load standard higher than the first load standard to a state of satisfying the second load standard, with respect to the input unit.

EMBODIMENT OF THE INVENTION

Hereinafter, each embodiment of the present invention is described with reference to drawings. In each embodiment hereinafter, a mobile phone is described as an example of a mobile terminal with an input device of the invention. However, the mobile terminal to which the input device of the present invention may be applied is not limited to a mobile phone, but is applicable to any arbitrary mobile terminal with a touch panel such as PDA. Furthermore, the present invention is not limited to mobile terminal, but is applicable to any arbitrary input terminal that has a touch panel such as an ATM at a bank, a ticketing machine at a station, and the like as described above.

(First Embodiment)

Figure 1:
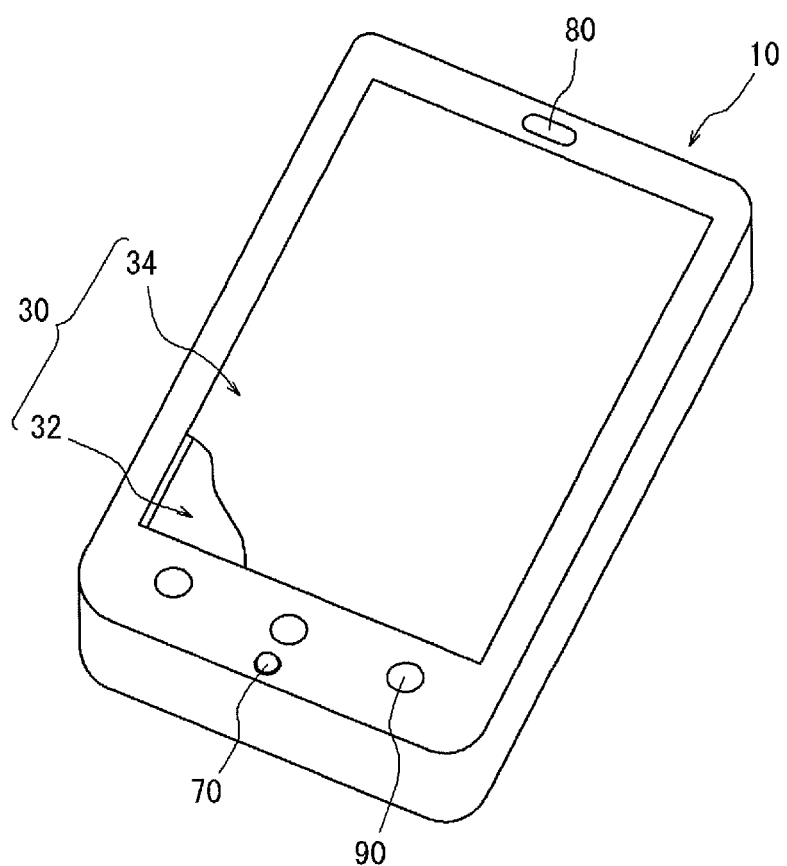
FIG. 1 is a perspective view showing an exterior of a mobile phone comprising an input device according to an embodiment of the present embodiment.

FIG. 1 is a perspective view showing an exterior of a mobile phone 10 comprising an input device according to a first embodiment of the present embodiment. The mobile phone 10 includes a display unit 32 depicting a variety of information and shapes such as keys or buttons and displaying the arrangement on a liquid crystal display (LCD) or an organic EL display at the front surface of the terminal main body as shown by cutting out a potion. Furthermore, in the mobile phone 10, an input unit 34, which includes matrix switches and the like where inputs with a user's finger, a stylus pen and the like are received, is arranged on a front face of the display unit 32. In the present embodiment, the display unit 32 and the input unit 34 inclusively constitute a touch panel 30. The mobile phone 10 further includes a voice-input unit 70 consisting of a microphone and the like, a voice-output unit 80 consisting of a speaker and the like, and a key-input unit 90 consisting of at least one mechanical key.

In addition, the mobile phone 10 may include a digital camera function part, a one-segment broadcasting tuner, a short-range radio communication part such as an infrared communication function part and the like, and various interfaces and the like, but the drawings and detailed descriptions are omitted.

Figure 2:
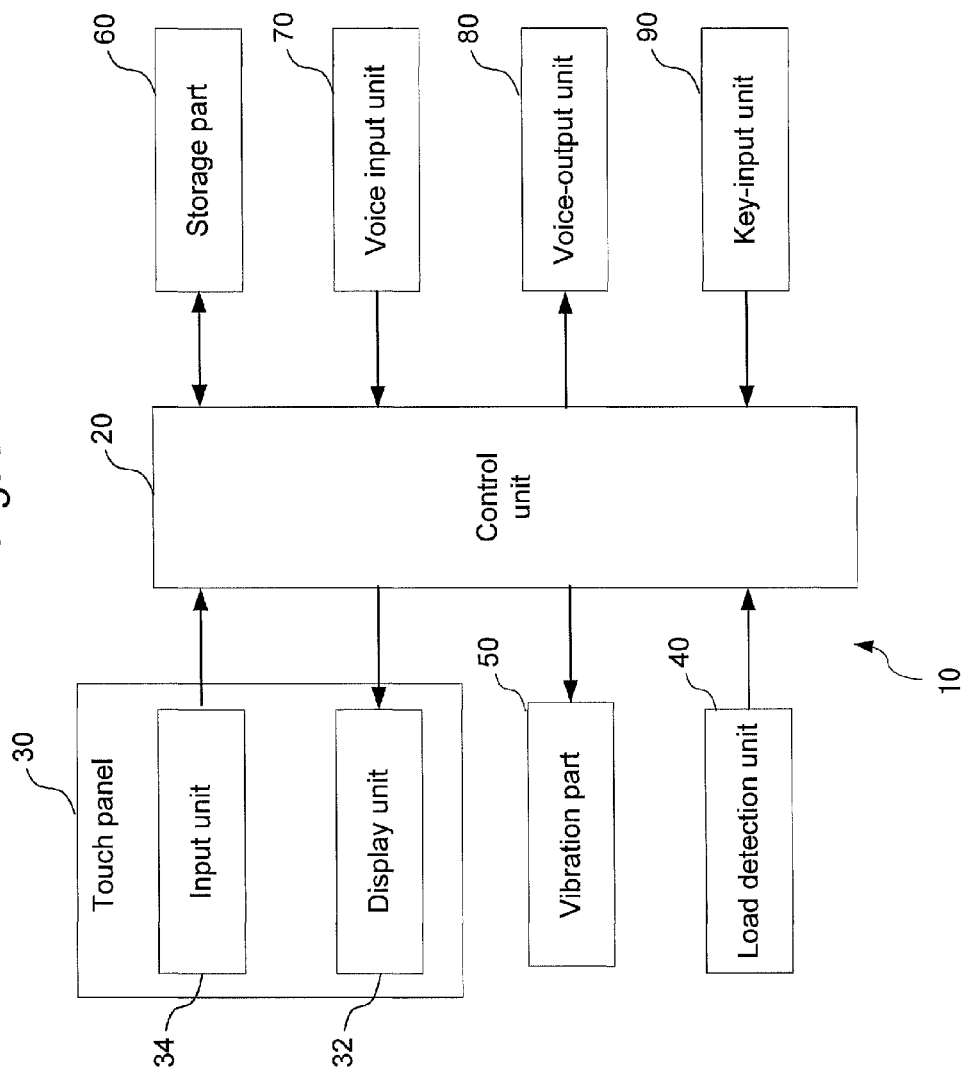
FIG. 2 is a functional block diagram showing an internal configuration of a mobile phone according to the present embodiment.

FIG. 2 is a functional block diagram schematically showing an internal configuration of the mobile phone 10. The mobile phone 10 includes a control unit 20, a touch panel 30, a load detection unit 40, a vibration part 50, a storage part 60, a voice-input unit 70, a voice-output unit 80, and a key-input unit 90 as shown in FIG. 2. The control unit 20 controls and manages the entire mobile terminal 10 including each function block of the mobile terminal 10. The touch panel 30 is configured by arranging, in an overlapping manner on the front face of the display unit 32, the input unit 34 where inputs from a user are received as described above. With such a configuration, the touch panel 30 receives operation inputs from the user and displays a variety of information such as input results and the like according to each application.

The input unit 34 of the touch panel 30 detects (receives) inputs by contact (pressing) with a fingertip of a user, a stylus or the like, and outputs a signal corresponding to the location where the input by the contact was detected. The touch panel 30 is configured, for example, by a publically known method such as resistive film method, capacitance method and the like. The display unit 32 displays display corresponding to each application, and renders and displays, on a predefined display region, a user interface consisting of various kinds of keys, buttons and the like for receiving operation inputs from a user with respect to the input unit 34 as well. Furthermore, the display unit 32 also displays icons of folders or files that are to be described later. Hereinafter, as described, in order to receive operation inputs from a user with respect to the input unit 34 of the touch panel 30, images such as various keys and buttons, icons of folders or files and the like to be displayed on the display unit 32 are simply described as "object."

The load detection unit 40 detects a pressing load with respect to the touch panel 30 (or to the input unit 34) and is configured, for example, with a strain gauge sensor. The vibration part 50 vibrates the touch panel 30 and is configured, for example, with a piezoelectric element, an ultrasonic transducer or the like. The relation of the load detection unit 40, vibration part 50, and the touch panel 30 in the configuration is described later.

The storage part 60 stores various applications, and various kinds of information and the like that have been input, and functions as a work memory and the like. Furthermore, the storage part 60 also stores a plurality of templates including various kinds of objects to be used in accordance with each application.

The voice-input unit 70 converts the voice of a user to input signals and sends the input signals to the control unit 20. The voice-output unit 80 converts the voice signals received from the control unit 20 to voice and outputs the voice. The key-input unit 90 sends a corresponding signal to the control unit 20 according to the operation input from the user. The usage and the function are defined for various keys constituting the key-input unit 90 in accordance with the application to be used.

The mobile phone 10 further comprises various functioning parts required for providing functions as a normal mobile phone such as an antenna, a radio communication part and the like for transmitting/receiving a variety of information such as voice communications and e-mail data to/from a base station via internet, wireless communications or the like. However, there is nothing different from publicly known technologies with regard to these; hence, the description is omitted.

Next, the relation of the above-mentioned load detection unit 40 and vibration part 50, and touch panel 30 is described.

Figure 3:
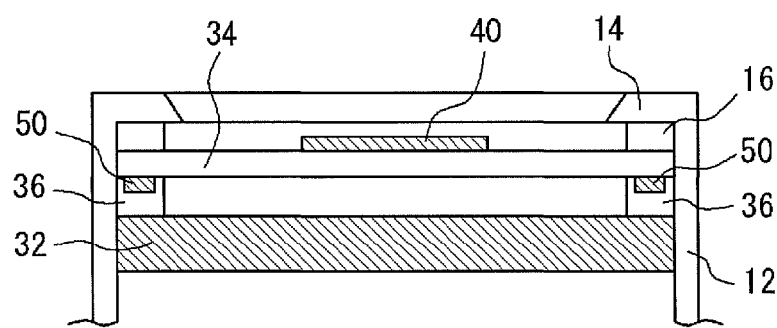
FIG. 3 is a diagram illustrating an exemplary assembling structure of a touch panel, a load detection unit and a vibration part of the mobile phone shown in FIG. 2.
Figure 3:
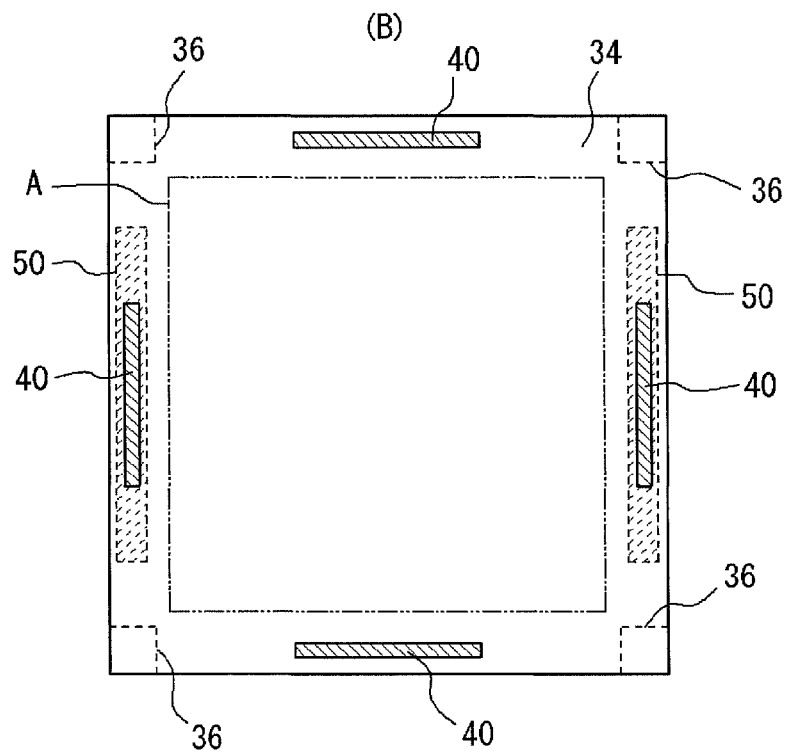

FIG. 3 is a diagram illustrating an exemplary assembling structure of touch panel 30, a load detection unit 40 and a vibration part 50 of the mobile phone 10 shown in FIG. 2. FIG. 3(A) is a cross-sectional view of the main part and FIG. 3(B) is a plan view of the main part.

The display unit 32 displaying various kinds of objects on the touch panel 30 is housed and held within a housing 12. An input device according to the present embodiment holds an input unit 34 on the display unit 32 via an insulator 36 that is composed of a resilient member. In the input device according to the present embodiment, the display unit 32 and the input unit 34 have a rectangular-shape with a plan view. Although the touch panel 30 is shown as a square in FIG. 3, the touch panel 30 may also be a rectangle according to the specifications of a mobile terminal in which the touch panel 30 is installed. Furthermore, the input device holds the input unit 34 on the display unit 32 via the insulator 36 that is arranged at four corners shown by dotted lines away from the display region A of the display unit 32 as shown in FIG. 3(B).

An upper cover 14 is provided for the input device in the housing 12 to cover the surface region of the input unit 34 that is outside the display region of the display unit 32, and the insulator 16 composed of a resilient member is arranged between the upper cover 14 and the input unit 34.

The surface of the input unit 34, that is, the face where operation inputs are received, for example, is composed of a clear film, and the back face is composed of glass. The input unit 34 has a structure allowing the clear film on the surface slightly warp (strain) in response to the pressed force when the operating surface is pressed.

In the input device according to the present embodiment, strain gauge sensors for detecting a pressing load (pressing force) applied to the input unit 34 is respectively provided by bonding or the like, in the vicinity of each side that is covered by the upper cover 14, on the clear film of the surface of the input unit 34. Furthermore, in the input device, piezoelectric elements, ultrasonic transducers or the like for vibrating the input unit 34 are respectively provided by bonding or the like, at the vicinity of two facing sides on the glass surface of the back face of the input unit 34. That is, the input device shown in FIG. 3 includes the load detection unit 40 shown in FIG. 2 constituted by four strain gauge sensors, and the vibration part 50 constituted by two transducers. The vibration part 50 can generate vibrations and deliver the vibration to the fingertip of the user that is pressing the input unit 34, or a pressing object such as a stylus pen and the like. Furthermore, the vibration part 50 drives, for example, two supersonic transducers in the same phase. The illustration of the housing 12, upper cover 14 and insulator 16 shown in FIG. 3A are omitted in FIG. 3B.

In the input device according to the present embodiment, the control unit 20 monitors inputs detected at the input unit 34 and also monitors pressing loads detected at the load detection unit 40. The control unit 20 is capable of determining whether or not the pressing load detected at the load detection unit 40 satisfies a predefined load standard (standard value). The load detection unit 40 detects, for example, a load from the average value of the outputs from the four strain gauge sensors.

Herein, the "predefined load standard" is the standard of a pressing load detected at the load detection unit 40 set as a standard for conducting opening/closing operations of a folder to be described later. The predefined load standard may be set from the initial settings of the mobile phone 10 or from changes to the settings made by the user. Furthermore, the load detection unit 40 is capable of detecting a pressing load, which changes from a state of not satisfying a predefined load standard to a state of satisfying the predefined load standard, with respect to the input unit 34 by monitoring temporal changes in the pressing load. Likewise, the load detection unit 40 is also capable of detecting a pressing load, which changes from a state of satisfying a predefined load standard to a state of satisfying the predefined load standard, with respect to the input unit 34 by monitoring temporal changes in the pressing load.

The value of a load standard is regarded as the "threshold value of a pressing load" and an aspect of determining that "the load standard is satisfied" in case of reaching the value of the load standard has been described thus far. Hereinafter, although a determining case according to such an aspect is described, the aspect determined as "the load standard is satisfied" is not limited to this, but presumably many aspects are presumed to be included. When a pressing load by a pressing input from a user with respect to an object happens to exceed the above value of the load standard, for example, it is possible to determine that "the load standard is satisfied." Furthermore, when the load detection unit 40 detects a pressing load indicating the above value of the load standard, it is also possible to determine that "the load standard is satisfied."

The same is true in an aspect where it is possible to determine that "the load standard is not satisfied." That is, in the following description, a case determining that "the load standard is not satisfied" is described if the value falls below the load standard. However, when the pressing load by a pressing input by the user with respect to an object happens to be below the above value of the load standard, it is also possible to determine that "the load standard is not satisfied." Moreover, if a pressing load indicating the above value of the load standard is no longer detected by the load detection unit 40, it is also possible to determine that "the load standard is not satisfied."

Figure 4:
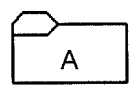
FIG. 4 is a diagram conceptually showing how opening and closing operations are conducted with respect to folders according to the first embodiment.
Figure 4:
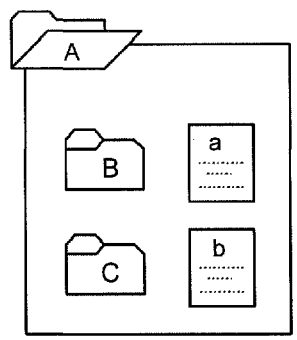
Figure 4:
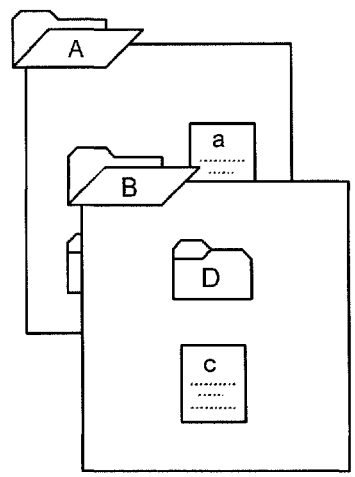

Next, opening and closing operations of folders according to the present embodiment are described. FIG. 4 is a diagram conceptually showing how opening and closing operations are conducted with respect to folders by an input device according to the present embodiment. In the present embodiment, folders based on the concept of a hierarchical structure of directories that is widely used in basic software of conventional operation system (OS) and the like are used. Therefore, in the present embodiment, each folder can include a plurality of files and/or more folders therein.

In the input device according to the present embodiment, displaying the content (object) of files and/or other folders included in one folder to inform the content of the folder to the user is stated as "opening" the folder. For example, if Folder A shown in FIG. 4(A) includes Folder B, Folder C, File a and File b, the content included in the Folder A is displayed as shown in FIG. 4(B) when the Folder A is opened. Moreover, for example, if the Folder B shown in FIG. 4(B) includes Folder D and File c, the content included in the Folder B is displayed as shown in FIG. 4(C) when the Folder B is opened.

In the input device according to the present embodiment, when one folder is opened and the content of the folder is displayed, returning to a state in which the content is not displayed is stated as "closing" the folder. In FIG. 4(C), for example, content included in the folder B (folder D as well as file c) are displayed, but a content shown in FIG. 4(B) is displayed when the Folder B is closed. Moreover, in FIG. 4(B), the content included in the folder A (folder B, folder C, file a, and file b) are being displayed, but closing the folder A brings a display such as the one shown in FIG. 4(A).

Next, detection of a pressing load with respect to the touch panel 30 of the input device according to the present embodiment is described.

The input device according to the present embodiment can cause the display unit 32 of the touch panel 30 to display objects of a folder having a hierarchical structure as shown in FIG. 4. In this event, the input unit 34 of the touch panel 30 receives a pressing input with respect to the display unit 32 by a fingertip of the user, a stylus or the like. In this manner, when the pressing input is applied to the input unit 34, the load detection unit 40 detects the pressing load with respect to the input unit 34.

Figure 5:
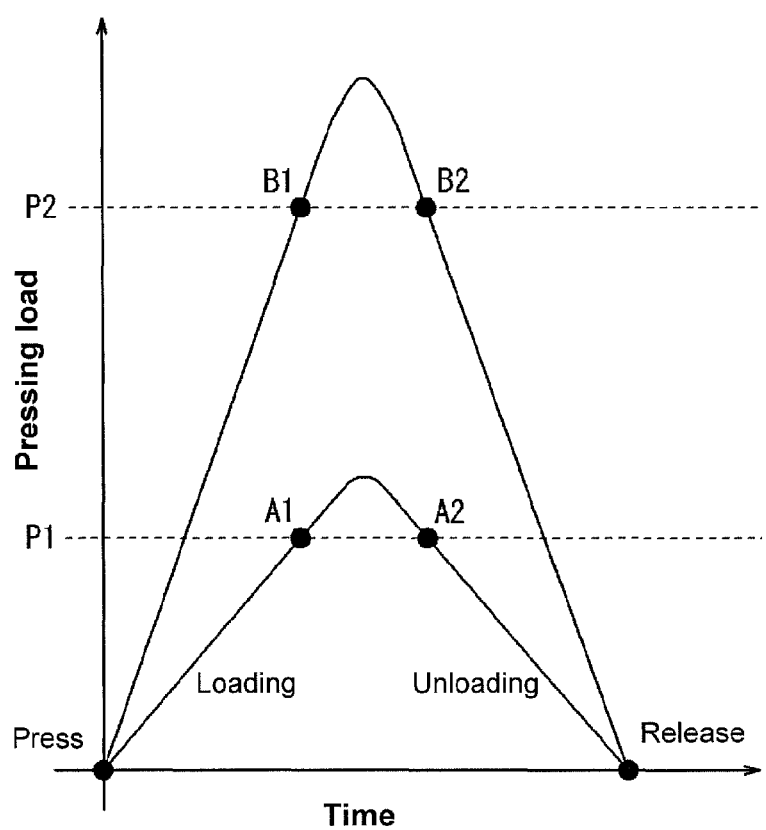
FIG. 5 is a graph schematically showing exemplary temporal changes of a pressing load detected by a load detection unit when a user presses an input unit of the touch panel.

FIG. 5 is a diagram showing an example in which a pressing load with respect to the input unit 34 by a fingertip of the user, a stylus or the like is detected by the load detection unit 40. FIG. 5 schematically shows exemplary temporal changes of a pressing load detected by the load detection unit 40 when the user conducts operation inputs by pressing the input unit 34 of the touch panel 30. In general, in the event of conducting an operation to press (pressing input) the input unit 34 of the touch panel 30, the user keeps increasing the pressing force with respect to the input unit 34 (that is, conducting an operation to press at the input unit 34) after touching the input unit 34 until the time when the user can determine that the input has been received. Furthermore, the user reduces the pressing force with respect to the input unit 34 (that is, an operation to release a finger from the input unit 34 takes place) from the time when the user determines that the input was received. Therefore, as shown by the curve in FIG. 4, the pressing load detected by the load detection unit 40 initially increases upwardly as the elapse of time from left to right and decreases downwardly during the course.

When the user conducts a normal operation input with respect to the input unit 34, since a pressing input is applied based on the normal pressing force, the load detection unit 40 detects, for example, the pressing load undergoing changes from A1 to A2 as shown in FIG. 5. On the other hand, when the user conducts an operation input with more pressing force than a normal operation input with respect to the input unit 34, since the pressing input is intentionally applied with more pressing force than a normal pressing force, the load detection unit 40 detects, for example, the pressing load undergoing changes from B1 to B2 as shown in FIG. 5.

In this manner, in the present embodiment, using the load detection unit 40 makes it possible to distinguish and detect a load standard (for example, P1 in FIG. 5) presuming a normal operation input by a normal pressing force and a load standard (for example, P2) presuming an operation input by a pressing force that is more powerful than normal. Furthermore, in case of setting a load standard as in P1 shown in FIG. 5, for example, it is possible to distinguish a pressing input (A1 in FIG. 5) changing from a state of not satisfying the load standard to a state of satisfying the predefined load standard from a pressing input (A2 in FIG. 5) changing from a state of satisfying the load standard to a state of satisfying the predefined load standard. Therefore, in the present embodiment, by distinguishing these two inputs, separate operations may be assigned respectively.

Next, a closing process of folders according to the present embodiment is described.

In the event of opening/closing a folder in the first embodiment, described is a process with respect to folders that has a hierarchical structure of at least two hierarchies or more. For the convenience of explanation, the folders are described as a first folder and a second folder. Herein, it is presumed that the second folder is located in the hierarchy that is immediately below the first folder. In addition to these folders, it is also possible to consider a third folder, a fourth folder, and the like. In this case, it is presumed that the third folder is located in the hierarchy that is immediately below the second folder and the fourth folder is located in the hierarchy that is immediately below the third folder. Likewise, from hereon, the present embodiment is applicable to folders with an arbitrary number of hierarchies.

In the present embodiment, at least a first load standard and a second load standard are set as standards for operations of opening/closing folders. In the present embodiment, the second load standard is set as a standard that is higher than the first load standard. Likewise, it is also possible to set a third load standard, a fourth load standard and the like, depending on the number of hierarchies of the hierarchical structure of a folder. In this case, gradually higher standards are set such that the third load standard is higher than the second load standard and the fourth load standard is higher than the third load standard.

Figure 6:
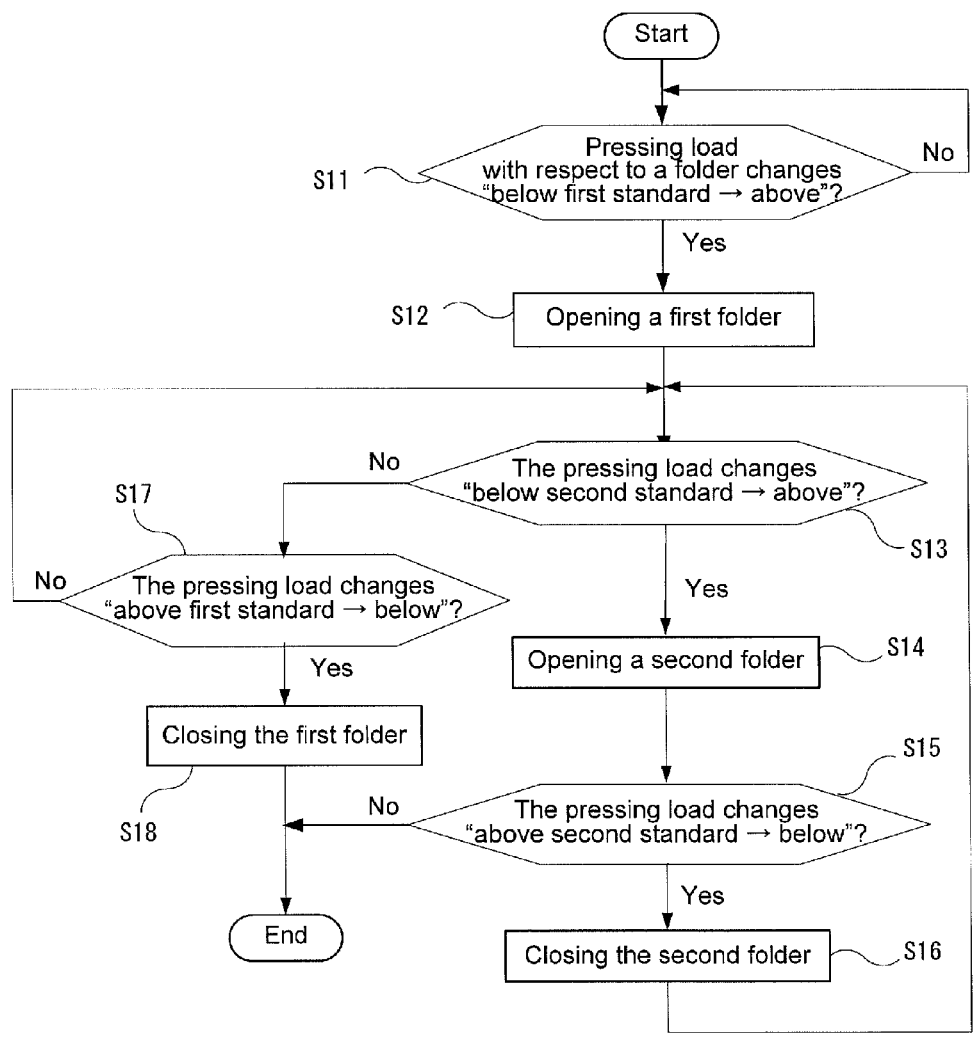
FIG. 6 is a flow diagram of an opening/closing process of a folder according to the first embodiment.

FIG. 6 is a flow diagram of an opening/closing process of a folder according to the first embodiment. The present process starts at a point when the input unit 34 of the touch panel 30 detects a pressing input by a finger of a user and the like. At the starting point of the present process, it is presumed that an object of the above-mentioned first folder is displayed on the display unit 32.

If the input unit 34 detects a pressing input with respect to the input unit 34 corresponding to the location of the first object of the folder, the control unit 20 determines whether or not the load detection unit 40 has detected a pressing load which changes from a state of not satisfying a first load standard to a state of satisfying the first load standard (Step S11). In the flow chart of FIG. 6, to simplify the statement, "from a state of not satisfying the standard to a state of satisfying the standard" is simply stated as "below standard→above." Furthermore, "from a state of satisfying the standard to a state of not satisfying the standard" is simply stated as "above standard→ below."

If the load detection detects, in Step S11, a pressing load that changes from a state of not satisfying the first load standard to a state of satisfying the first load standard, the control unit 20 opens a first folder (Step S12). That is, the control unit 20 displays, on the display unit 32, files included in the hierarchy that is immediately below the first folder to be opened and/or objects of a second folder.

After Step S12, the control unit 20 determines whether or not the load detection unit 40 has detected a pressing load that changes from a state of not satisfying the second load standard to a state of satisfying the second load standard (Step S13).

Then, if the load detection unit 40 detects, in Step 13, pressing load that changes from a state of not satisfying the second load standard to a state of satisfying the second load standard, the control unit 20 opens the second folder (Step S14). That is, the control unit 20 displays, on the display unit 32, files that are included in the hierarchy that is immediately below the second folder to be opened and/or the object of the third folder. If the input of the pressing load that changes from a state of not satisfying the second load standard to a state of satisfying the second load standard is accepted at a location of the object of the second folder or at a location other than the location of the object, the control unit 20 opens the second folder.

After opening the second folder in Step S14, the control unit 20 determines whether or not the load detection unit 40 has detected a pressing load that changes from a state of satisfying the second load standard to a state of not satisfying the second load standard (Step S15). If the pressing load that changes from a state of satisfying the second load standard to a state of not satisfying the second load standard is not detected in Step S15, the present process ends. However, even in this case, if a third folder that is included in the second folder is displayed on the display unit 32, the input unit 34 is capable of continuously receiving an input by a pressing load that does not satisfy the third load standard.

While a third folder is being displayed, if the load detection unit 40 detects a pressing load, with respect to the input unit 34, that changes from a state of not satisfying the third load standard to a state of satisfying the third load standard, it is presumed that the process shown in the flow diagram of FIG. 6 has newly started. In this case, the processes after Step S11 are repeated. Since such processes may be repeated in the present embodiment, the user is able to gradually increase the pressing load with respect to the object of the first folder to sequentially open the first folder, second folder, and third folder.

Figure 7:
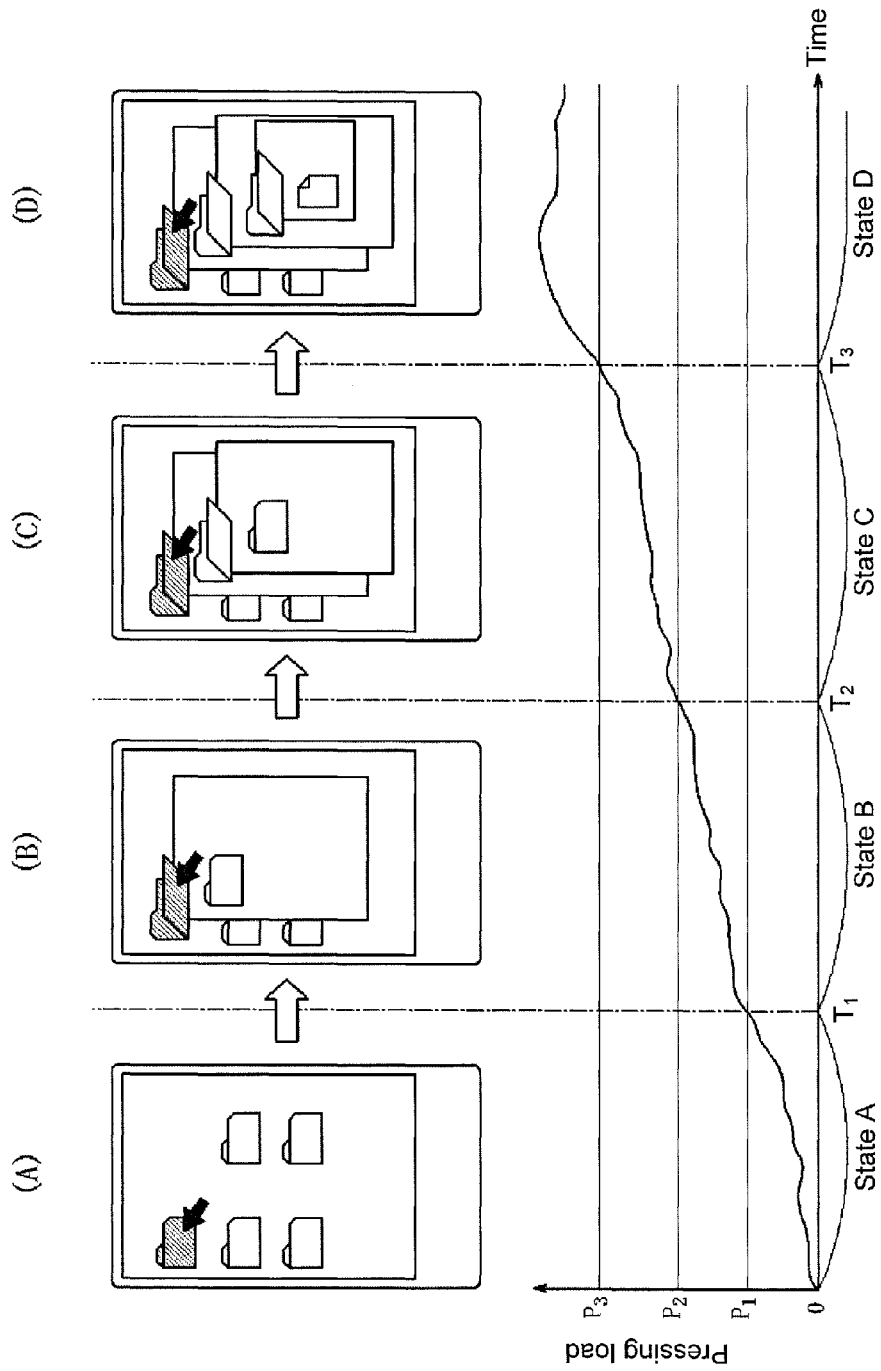
FIG. 7 is a diagram showing an exemplary operation process based on the process according to the first embodiment.

FIG. 7 is a diagram showing an exemplary operation process of sequentially opening folders based on the process according to the above-mentioned embodiment. In the event of conducting the aforementioned process, temporal changes of the pressing load with respect to the input unit 34 of the touch panel 30 detected by the load detection unit 40 is shown at a lower part of FIG. 7, and an exemplary drawing of the accompanying display changes of the display unit 32 is shown at a higher part of FIG. 7. In FIG. 7, the first load standard described in the above-mentioned process is indicated as "load standard P1," the second load standard as "load standard P2" and the third load standard as "load standard P3."

State A shown in FIG. 7(A) indicates how pressing force applied to a pressing input increases after a user has touched the input unit 34 of the touch panel 30 with a fingertip or the like. In FIG. 7(A), hatching is added to show an object of a folder corresponding to a location of the input unit 34 where an input is detected. In this manner, if an object such as a folder, a file and the like is present at a location of the input unit 34 where the input is detected, the control unit 20 may preferably add a color to the object or the like to indicate the user that an input corresponding to the object has been detected. An arrow attached to the folder that is shown by adding hatching in FIG. 7(A) indicates that an input by a user's fingertip and the like has been detected at the location. Such an object indicating an input location can be set to be displayed or not to be displayed on the display unit 32.

In FIG. 7(A), the user is pressing the first folder at an upper left on the input unit 34 of the touch panel 30. If the pressing load pressing the input unit 34 changes from a state of not satisfying the first load standard P1 to a state of satisfying the first load standard P1 (Step S11: Yes branch) while the user is pressing the first folder, the control unit 20 opens the first folder that was being pressed as shown in FIG. 7(B) (Step S12). Then, if the pressing load pressing the input unit 34 changes from a state of not satisfying the second load standard P2 to a state of satisfying the second load standard P2 (Step S13: Yes branch), the control unit 20 opens the second folder that is included in the first folder that has opened as shown in FIG. 7(C) (Step S14). Thereafter, the user can open the third folder shown in FIG. 7(C) by conducting the same operation as shown in FIG. 7(D).

In this manner, in the present embodiment, the user is able to consecutively open folders by gradually increasing the pressing load with respect to the input unit 34 of the touch panel 30. This makes it unnecessary to repeat an independent operation for opening a folder a multiple number of times in the mobile phone 10 according to the present embodiment. Therefore, movement across the hierarchies of a folder with a plurality of hierarchical structures becomes possible without spending time and effort, thus, making it possible to simply and promptly conduct reliable folder operations. When the first folder opens, it is also possible that a plurality of second folders may be included in the hierarchy that is immediately below the first folder. In such a case, after the plurality of second folders included in the first folder are displayed in the display unit 32, if the pressing load pressing the input unit 34 changes from a state of not satisfying the second load standard P2 to a state of satisfying the second load standard P2, the control unit 20 preferably opens the entire plurality of second folders.

A case may also be assumed in which a user may wish to start an application for opening (executing) the file while files that are included in the first and second folders are displayed in the display unit 32. In this case, the user is able to move (slide) the input location to the object of the file while applying a pressing load, to the input unit 34, satisfying the first load standard but not satisfying the second load standard. Even if such an input is conducted, a pressing load satisfying the second load standard is not detected, the second folder is not opened. After moving the input location to the object of the file to be executed, the user can execute the file (without opening the second folder) by applying a pressing load, to the input unit 34, that changes the state of not satisfying the second load standard to a state of satisfying the second load standard.

On the other hand, after the second folder is opened in Step S14 of FIG. 16, if a pressing load that changes a state of satisfying the second load standard to a state of not satisfying the second load standard is detected in Step 15, the control unit 20 controls so as to close the second folder (Step S16). That is, the control unit 20 brings the objects of the files included in the hierarchy immediately below the second folder that has been opened and/or of the third folder back to a state of not displaying in the display unit 32. Then, the control unit 20 returns to Step S31.

After returning to Step S13, if a pressing load that changes from a state of not satisfying the second load standard to a state of satisfying the second load standard is not detected, the process moves to Step S17. The control unit 20 determines in Step S17 whether or not the load detection unit 40 has detected a pressing load that changes a state of satisfying the first load standard to a state of not satisfying the first load standard. If a pressing load that changes from a state of satisfying the first load standard to a state of not satisfying the first load standard is detected in Step S17, the control unit 20 controls that the first folder is closed, and that the process ends (Step S18).

In the process of closing folders described above, a case of closing the first folder after closing the second folder was described, but likewise, the same is applicable to cases of closing the second folder after closing the third folder. Since such a process may be repeated in the present embodiment, the user can sequentially close each folder one after another and move the folder to a folder of an immediately higher level by gradually reducing the pressing load with respect to the input unit 34.

Figure 8:
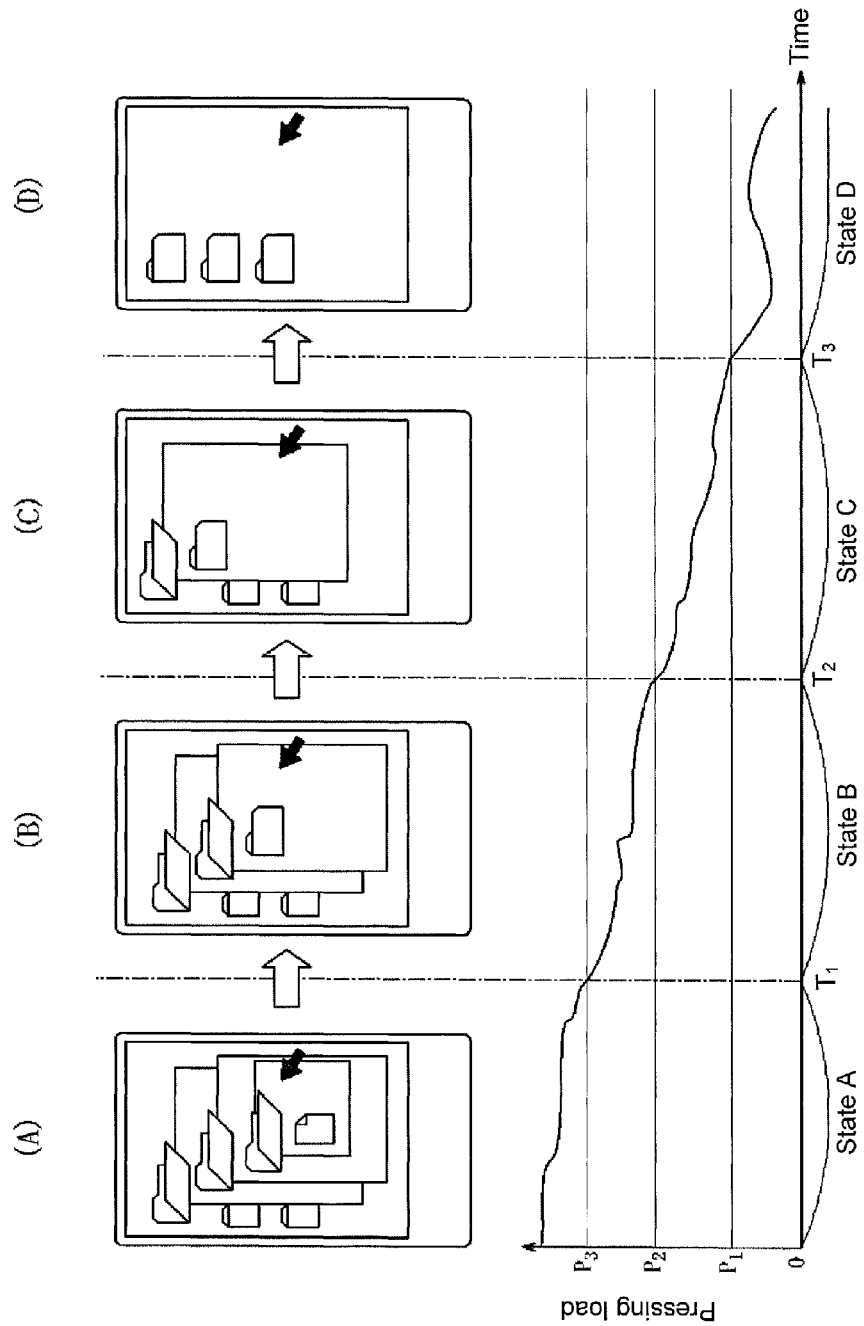
FIG. 8 is a flow diagram for showing how opening/closing a folder are processed according to the first embodiment.

FIG. 8 is an illustration of exemplary operations to show a process consecutively closing folders based on the process of the above-mentioned present embodiment. In FIG. 8, the first load standard described in the above-mentioned process is indicated as "load standard P1," the second load standard as "load standard P2" and the third load standard as "load standard P3."

Three folders are in an open state and displayed in the display unit 32 in FIG. 8(A). That is, in this state, the content of folders from the highest level to the third hierarchy is displayed. Herein, described is a case in which the second folder is located in the hierarchy that is immediately below the first folder, the third folder is located in the hierarchy that is immediately below the second folder, and files exist in the hierarchy that is immediately below the third folder. At this time, if the pressing load by the user pressing the input unit 34 of the touch panel 30 changes from a state of satisfying the third load standard P3 to a state of not satisfying the third load standard P3 (Step S15: Yes branch), the control unit 20 closes the third folder as shown in FIG. 8(B) (Step S16). The input of the pressing load that changes from a state of satisfying the third load standard P3 to a state of not satisfying the third load standard P3 at the time of closing the folder may be at a location of the object of the folder that was opened or may also be at a location other than the folder.

Then, if the pressing load by the user pressing the input unit 34 changes from a state of satisfying the second load standard P2 to a state of not satisfying the second load standard P2 (Step S17: Yes branch), the control unit 20 closes the second folder as shown in FIG. 8(C) (Step S18). Even after this, the user can close the first folder shown in FIG. 8(C) by conducting the same operation as shown in FIG. 8(D).

In this manner, in the present embodiment, the user can conduct an operation of consecutively closing folders by gradually reducing the pressing load with respect to the input unit 34 of the touch panel 30. Therefore, it is unnecessary to repeat an independent operation for closing folders a multiple number of times in the mobile phone 10 according to the present embodiment. Therefore, movement across the hierarchies of a folder with a plurality of hierarchical structures may be possible and reliable folder operations can be conducted simply and promptly without spending time and effort (Second Embodiment)

Next, described is a closing process of folders according to the second embodiment of the present invention.

The second embodiment has, for example, a change in the continuous closing process of folders after the continuous opening process of folders in the first embodiment as described above. The input device according the first embodiment conducts an operation for sequentially closing folders with gradual reduction in the pressing load by user with respect to the input unit 34 of the touch panel 30. In the input device according to the second embodiment conducts an operation for sequentially closing folders with gradual increase in the pressing load by the user with respect to the input unit 34 of the touch panel 30. Since the process for sequentially opening process can be conducted in a similar manner to the above-mentioned first embodiment as described above, descriptions that are the same as the first embodiment are omitted.

In the first embodiment, folders are opened consecutively as the pressing load by the user with respect to the input unit 34 of the touch panel 30 gradually increases, and if the pressing load decreases during the course, a folder that is open can be closed. In the second embodiment, folders are opened consecutively as the pressing load by the user with respect to the input unit 34 of the touch panel 30 gradually increases, but even if the pressing load decreases during the course, the process of closing a folder that is open does not take place. In the second embodiment, for example, the process of closing a folder that is open is conducted according to the detection, by the load detection unit 40, of the pressing load from the user with respect to the input unit 34 corresponding to a location other than the folder in the display unit 32.

Figure 9:
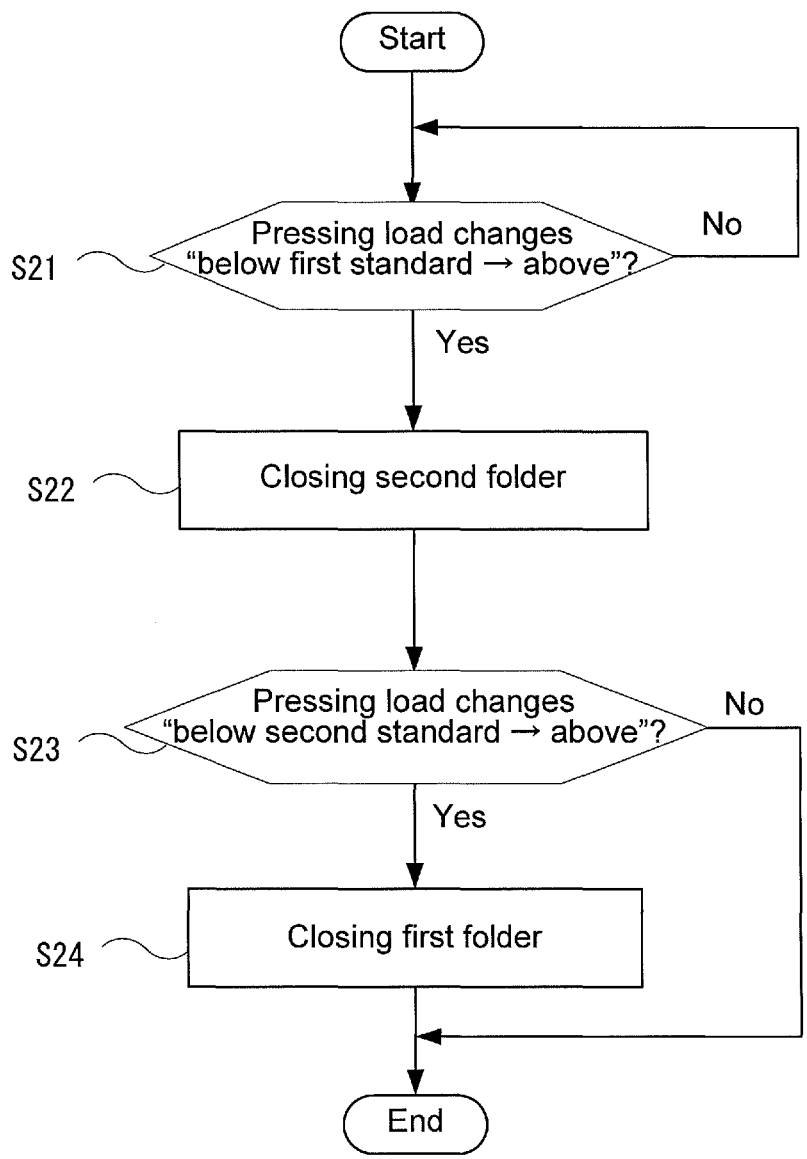
FIG. 9 is a diagram showing an exemplary operation process based on a process in which the opening operation of folders according to the second embodiment is repeated.

FIG. 9 is a flow diagram of a closing process of a folder according to the second embodiment. The process starts at a time when the input unit 34 of the touch panel 30 detects a pressing input by a finger of a user, and the like. It is presumed that an object of the folder that has been opened as a result of a process of opening the folder according to the first embodiment is displayed on the display unit 32 at the start point of the present process. In this case, it is presumed that at least the first folder and the second folder which is included in the hierarchy that is immediately below the first folder are in an open state and are displayed in the display unit 32

Once the present process starts, the control unit 20 determines whether or not the load detection unit 40 has detected a pressing load, by the user, that changes from a state of not satisfying the first load standard to a state of satisfying the first load standard (Step S21). If the pressing load that changes from a state of not satisfying the first load standard to a satisfying state is detected in Step S21, the control unit 20 controls so as to close the second folder (Step S22).

Then, the control unit 20 determines whether or not the load detection unit 40 has detected the pressing load, by the user, that changes from a state of not satisfying the second load standard to a state of satisfying the second load standard (Step S23). If the pressing load that changes from a state of not satisfying the second load standard to a state of satisfying the second load standard is detected in Step S23, the control unit 20 controls so as to close the first folder (Step S24).

Figure 10:
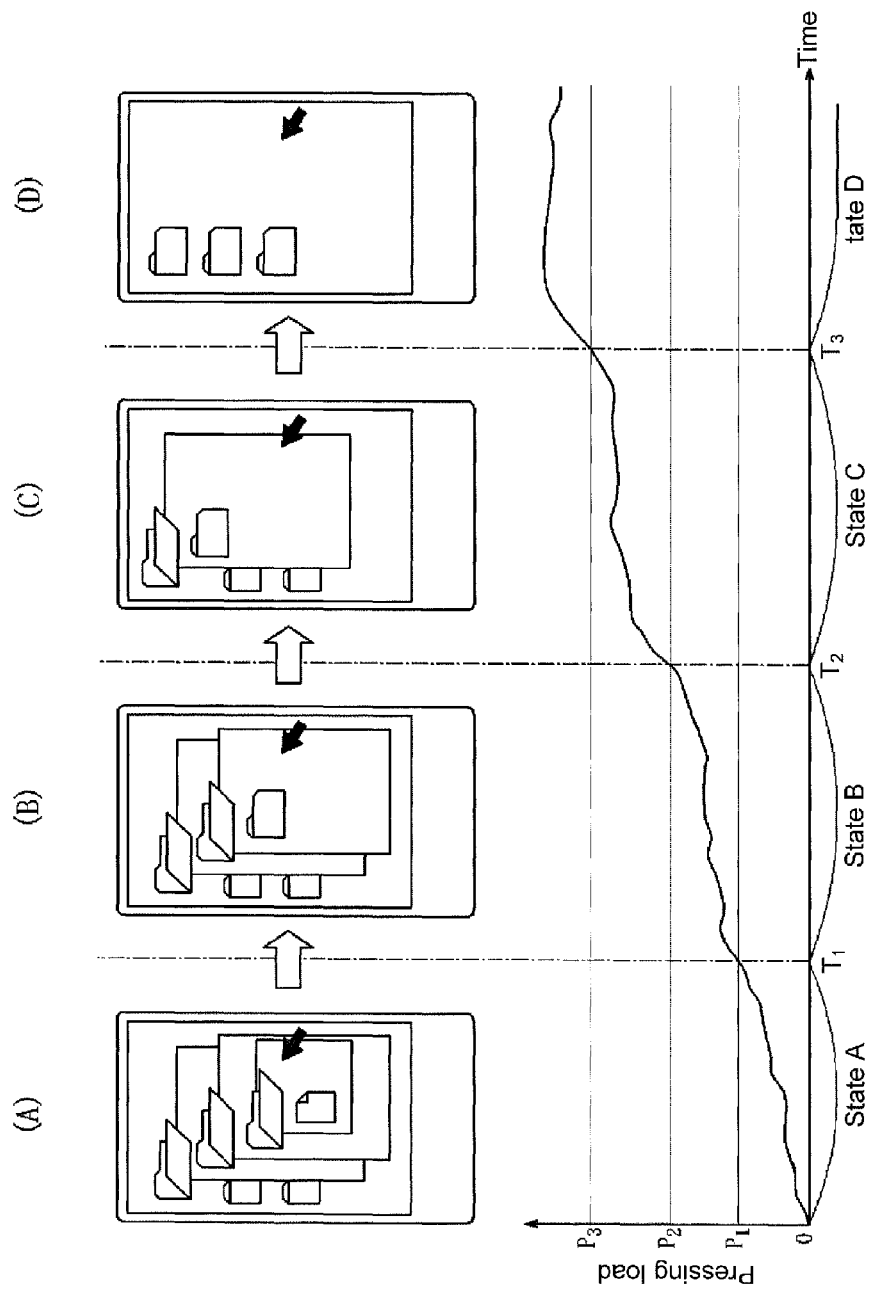
FIG. 10 is a diagram showing an exemplary operation process based on a process in which the closing operation of folders according to the second embodiment is repeated.
Figure 11:
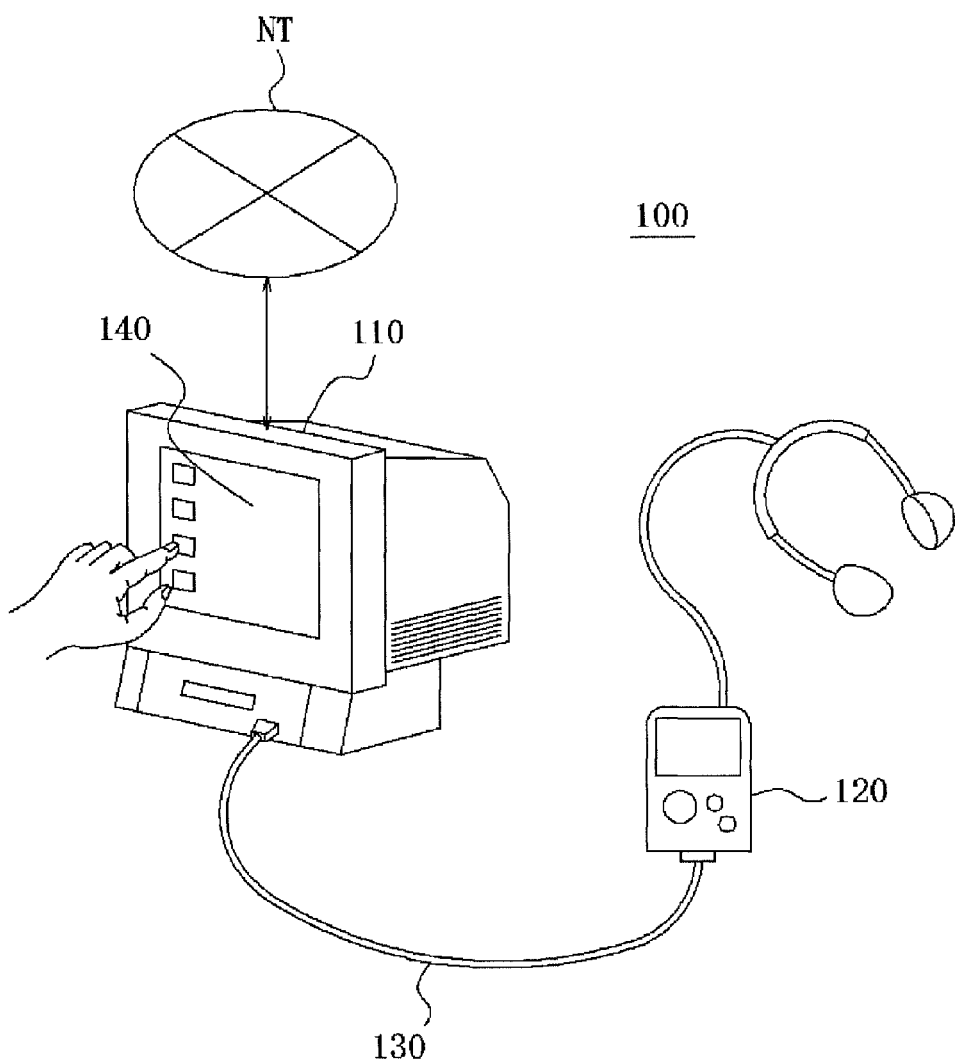
FIG. 11 is a diagram schematically showing a configuration of a data transfer system that includes an information processor by conventional technologies.
Figure 12:
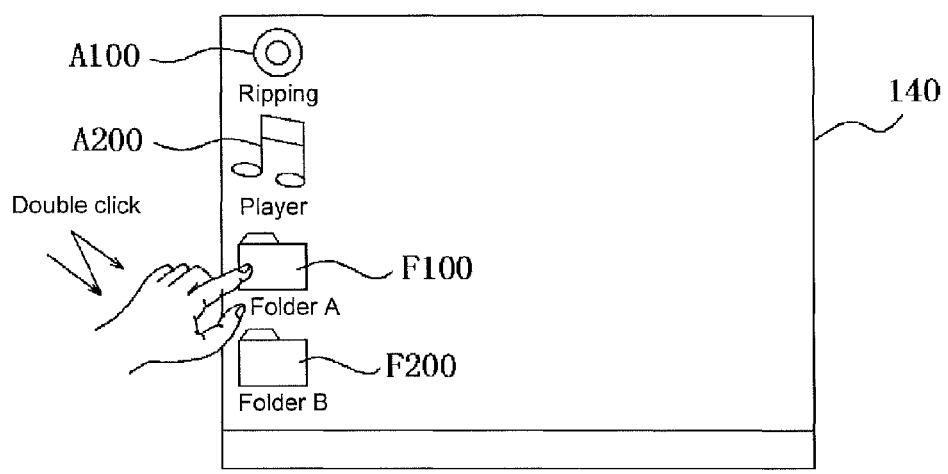
FIG. 12 is a diagram schematically showing how a user conducts operations of a folder on the display unit comprising a touch panel in the data storage playback device by conventional technologies.
Figure 12:
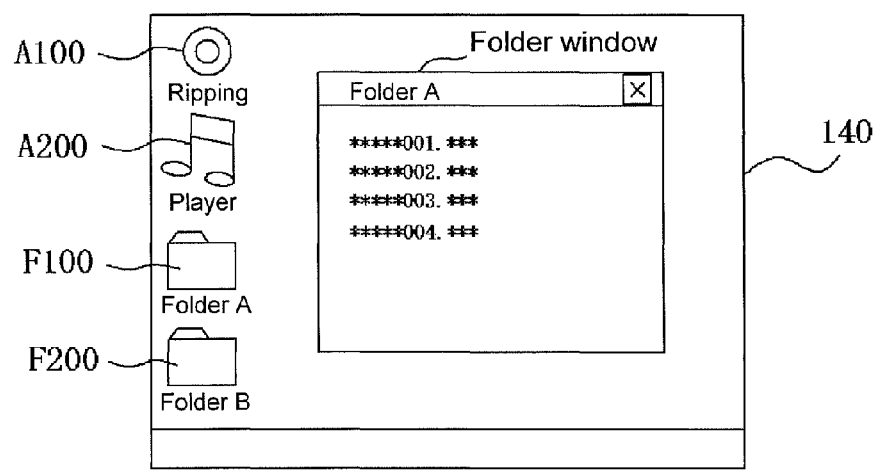

FIG. 10 is an illustration of an exemplary operation for consecutively closing folders based on the above-mentioned process of the second embodiment. In FIG. 10, the first load standard described in the above-mentioned process is indicated as "load standard P1," the second load standard as "load standard P2, and the third load standard as "load standard P3."

In FIG. 10(A), three folders have been opened and are displayed in the display unit 32. Also herein, similar to FIG. 8, described is a case in which the second folder is in the hierarchy that is immediately below the first folder, the third folder is in the hierarchy that is immediately below the second folder, and files exist in the hierarchy that is immediately below the third folder. At this time, when a pressing load by the user for pressing the input unit 34 of the touch panel 30 changes from a state of satisfying the first load standard P1 to a satisfying state (Step S21: Yes branch), the control unit 20 closes the third folder as shown in FIG. 10(B) (Step S22). Then, if the pressing load by the user pressing the input unit 34 changes from a state of not satisfying the second load standard P2 to a state of satisfying the second load standard P2 (Step S23: Yes), the control unit 20 closes the second folder as shown in FIG. 10(C) (Step S24). Even after this, the user can close the first folder shown in FIG. 10(C) by conducting the same operation as shown in FIG. 10(D).

In this manner, in the present embodiment, the user can conduct an operation of consecutively closing folders by gradually increasing the pressing load with respect to the input unit 34 of the touch panel 30. Therefore, it is unnecessary to repeat an independent operation for closing a folder a multiple number of times in the mobile phone 10 according to the present embodiment. Therefore, movement across the hierarchies of a folder with a plurality of hierarchical structures may be possible and reliable folder operations can be conducted simply and promptly without spending time and effort.

If a user temporarily releases a fingertip or the like that is inputting from the input unit 34 while an operation of consecutively opening folders is in progress, a state in which folders are being opened may be maintained without closing all the folders that have been opened up until then.

The present invention is not limited to above-described embodiments. Many changes or modifications are possible. In the above embodiment, for example, the value of each load standard is presumed to be preliminarily set, but the user can preferably change or adjust the value when necessary. In this way, if the user feels uncomfortable with regard to the pressing load setting during an operation, the user can appropriately correct the settings afterward.

In each of the above-described embodiments, an exemplary process of informing a user by adding colors to objects was described in order to indicate to a user that an input related to an object such as a folder and the like is being detected or in order to show closing folders. However, if an input related to an object is detected, it is also possible to let the user recognize it by vibrating the vibration part 50 instead of adding a color to the object, or in addition to adding a color to the object. Furthermore, in such a case, for example, it is also possible to let the user recognize it by generating a specific sound from the voice-output unit 80 instead of by vibrations.

Moreover, in addition to what has been described in the above embodiments, for example, it is also possible to indicate that a process with respect to the input from the user is conducted appropriately by vibrating the vibration part 50 in Step S12, in Step S14 and the like.

INDUSTRIAL APPLICABILITY

According to an input device of the present invention, a user can open folders a plurality of times and close the folders a plurality of times via a series of operations. Therefore, movement across the hierarchies of a folder with a plurality of hierarchical structures may be simply and promptly conducted

REFERENCE NUMERALS

10: mobile phone
20: control unit
30: touch panel
32: display unit
34: input unit
40: load detection unit
50: vibration part
60: storage part
70: voice-input unit
80: voice-output unit
90: key-input unit

The invention claimed is:

1. An input device, comprising:
   a display unit displaying an object of a folder with a hierarchical structure;
   an input unit receiving pressing inputs with respect to the display unit;
   a load detection unit defecting a pressing load with respect to the input unit, and
   a control unit controlling that a first folder is opened when the load detection unit detects a pressing toad, which changes from a state of not satisfying a first load standard to a state of satisfying the first load standard, with respect to the input unit corresponding to a location of the object of the first folder, and
   wherein after the first folder is opened, the control unit opens a second folder when the load detection unit detects a pressing load which changes from a state of not satisfying a second load standard higher than the first load standard to a continuous state of satisfying the second load standard, with respect to the input unit, and
   wherein the second folder is immediately below the first folder in the hierarchical structure.

2. The input device according to claim 1, wherein the control unit further controls that the second folder is closed if the load detection unit detects a pressing load, which changes from a state of satisfying the second load standard to a state of not satisfying the second load standard, with respect to the input unit, and the first folder is closed if the load detection unit detects a pressing load, which changes from a state of satisfying the first load standard to a state of not satisfying the first load standard, with respect to the input unit.

3. The input device of claim 1, wherein the pressing input is a continuous pressing input that results in the pressing load, which changes from the state of not satisfying the first load standard to the state of satisfying the first load standard and that results in the pressing load which changes from the state of not satisfying the second load standard higher than the first load standard to the state of satisfying the second load standard.

4. The input device of claim 1, wherein the pressing i put remains at a first point when producing the pressing load which changes from the state of not satisfying the first load standard to the state of satisfying the first load standard and when producing the pressing load which changes from the state of not satisfying the second load standard higher than the first load standard to the state of satisfying the second load standard.

5. The input device of claim 1, wherein the second folder included in the hierarchy that is immediately below the first folder comprises is a plurality of second folders; and
   wherein if the load detection unit detects that the pressing load satisfying the second load standard, then the plurality of second folders are opened.

6. An input device, comprising:
   a display unit displaying an object of a folder with a hierarchical structure;
   an input unit receiving pressing inputs with respect to the display unit;
   a load detection unit detecting a pressing load with respect to the input unit, and
   a control unit controlling that, when a first folder and a second folder are open and displayed on the display unit, wherein the second folder is immediately below the first folder in the hierarchical structure:
the second folder is closed when he load detection unit detects a pressing load, which changes from a state of not satisfying a first load standard to a state of satisfying the first load standard, with respect to the input unit; and
the first folder is closed when the load detection unit detects a pressing load, which changes from a state of not satisfying a second load standard higher than the first load standard to a continuous state of satisfying the second load standard, with respect to the input unit.

7. The input device of claim 6, ere in the pressing input is a continuous pressing input that results in the pressing load which changes from the state of not satisfying the first load standard to the state of satisfying the first load standard and that results, in the pressing load which changes from the state of not satisfying the second load standard higher than the first load standard to the state of satisfying the second load standard.

8. The input device of claim 6, wherein the pressing input remains at a first point when producing the pressing load which changes from the state of not satisfying the first load standard to the state of satisfying the first load standard and when producing the pressing load which changes from the state of not satisfying the second load standard higher than the first load standard to the state of satisfying the second load standard.

9. The input device of claim 6, wherein the second folder included in the hierarchy that is immediately below the fiat folder comprises is a plurality of second folders; and wherein if the load detection unit detects that the pressing load satisfies the second load standard, then the plurality of second folders are closed.

10. An input device, comprising:
a display unit displaying an object of a folder with hierarchical structure;
an input unit receiving pressing inputs with respect to the display unit;
a load detection unit detecting to pressing load with respect to the input unit, and
a control unit controlling that, when a first folder displayed on the display unit and a second folder included in a hierarchy that is immediately below the first folder are open:
the second folder is closed if the load detection unit detects a pressing load, which changes from a state of not satisfying a first load standard to a state of satisfying the first load standard, with respect to the input unit; and
the first folder is closed if the load detection unit detects a pressing bad, which changes from a state of not satisfying a second load standard higher than the first load standard to a continuous state of satisfying the second load standard, with respect to the input unit;
wherein the pressing input is a continuous pressing input that results in the pressing load which changes from the state of not satisfying the first load standard to the state of satisfying the first load standard and that results in the pressing load which changes from the state of not satisfying the second load standard higher than the first load standard to the state of satisfying the second load standard.

\* \* \* \* \*

UNITED STATES PATENT AND TRADEMARK OFFICE
CERTIFICATE OF CORRECTION

Page 1 of 1

| | |
|---|---|
| PATENT NO. | : 9,122,364 B2 |
| APPLICATION NO. | : 13/147762 |
| DATED | : September 1, 2015 |
| INVENTOR(S) | : Megumi Kuwabara and Junichi Ujii |

It is certified that error appears in the above-identified patent and that said Letters Patent is hereby corrected as shown below:

In the Claims

Column 16, Line 12, delete "a load detection unit defecting a pressing load" and replace with -- a load detection unit detecting a pressing load --

Column 16, Line 15, delete "detects a pressing toad, which" and replace with -- detects a pressing load, which --

Column 16, Line 45, delete "claim 1, wherein the pressing i put" and replace with -- claim 1, wherein the pressing input --

Column 17, Line 3, delete "when he load detection unit detects" and replace with -- when the load detection unit detects --

Column 17, Line 14, delete "claim 6, ere in the pressing input is" and replace with -- claim 6, wherein the pressing input is --

Column 17, Line 31, delete "that is immediately below the fiat folder" and replace with -- that is immediately below the first folder --

Signed and Sealed this
Sixteenth Day of February, 2016

Michelle K. Lee
*Director of the United States Patent and Trademark Office*